Sept. 16, 1969  J. D. GINER  3,467,552
ELECTROCHEMICAL FUEL CELL
Filed Sept. 30, 1965
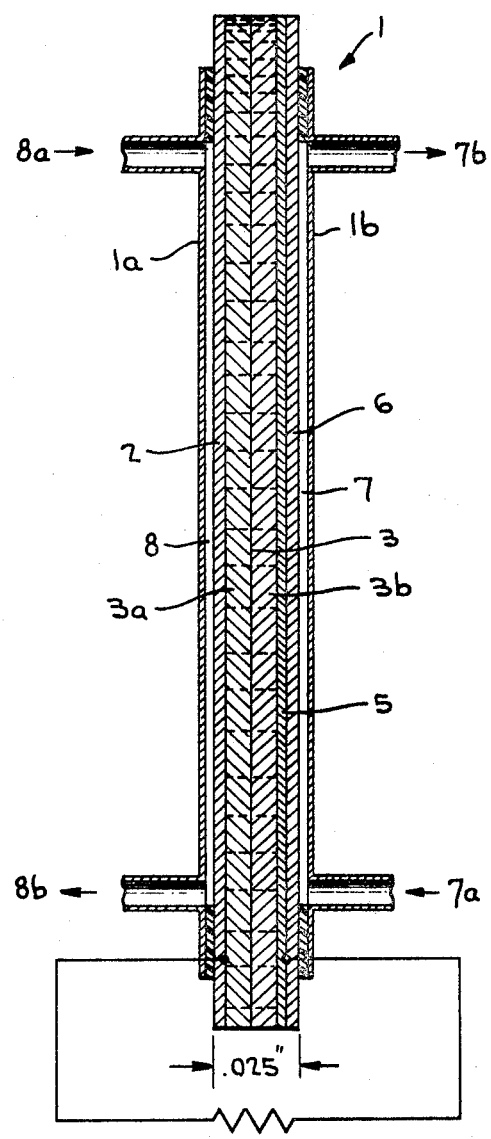
INVENTOR,
JOSÉ D. GINER

United States Patent Office 3,467,552
Patented Sept. 16, 1969

3,467,552
ELECTROCHEMICAL FUEL CELL
Jose D. Giner, Glastonbury, Conn., assignor, by mesne assignments, to Leesona Corporation, Cranston, R.I., a corporation of Massachusetts
Filed Sept. 30, 1965, Ser. No. 491,760
Int. Cl. H01m 27/04
U.S. Cl. 136—86       14 Claims

ABSTRACT OF THE DISCLOSURE

A compact fuel cell comprising a multiple constituent electrolyte matrix is described. The matrix comprises a non-conductive element and a conductive element. Thin electrochemically active electrodes are in contact with the major surfaces of the multiple constituent electrolyte matrix.

---

This invention relates to a compact fuel cell. More particularly, the invention embraces a compact fuel cell comprising an electrolyte contained in a multiple constituent matrix, one constituent being conductive and one constituent being non-conductive, and lightweight thin electrodes in intimate contact with said matrix. The composite fuel cell is extremely compact providing a high energy to volume and high energy to weight ratio.

A fuel cell as the term is employed herein designates an electrochemical cell for the direct conversion of chemical energy to electrical energy. In the most simplified form, the cell comprises a housing, an oxidizing electrode, a fuel electrode and an electrolyte. In operation, it is necessary that the fuel and oxidant contact a surface of their respective electrodes where a process of adsorption and de-adsorption occurs, leaving the electrodes electrically charged, with the second surface of the electrodes being in contact with an electrolyte which acts as an ion-transfer medium. An external circuit is provided connecting the electrodes of the cell through a suitable load where work is accomplished.

It is recognized in the art that fuel cells have a high potential in the production of electrical current in that the cell is not governed by the Carnot heat cycle. Additionally, the basic cell is simple to construct and has few or no moving parts, reducing servicing to a minimum. However, in actual construction, the design of a commercially acceptable fuel cell has been found to be replete with problems. It is necessary to employ materials as the electrodes which have high electrochemical activity at the operating temperature of the cell and high resistance to deterioration at the operating environment of the cell. Understandably, the higher the operating temperature of the cell, the greater the reactivity at the electrodes. However, with an increase in operating temperature, ancillary problems such as more rapid deterioration of the electrodes, removal of waste heat and insulation of the cell are increased. Further, the electrodes must be thin in order to have as low an ohmic resistance across the electrode as possible, but still must be structurally able to withstand the pressures at which the reactant gases are fed to the cell. Additionally, the electrodes must be insulated from each other, but still be sufficiently conductive, or be in intimate contact with a conductive element, to provide an electronic circuit between the terminals of the cell.

Accordingly, it is an object of the present invention to provide a fuel cell which is compact and has a high energy to volume and high energy to weight ratio.

It is another object of the invention to provide a fuel cell comprising a liquid electrolyte contained in a multiple component matrix, one component being conductive and one component being non-conductive, with said matrix serving as a container for the electrolyte and as an insulator between the electrodes.

These and other objects of the invention will be more fully apparent from the following detailed description with particular emphasis being placed on the drawing and working example.

The objects of the present invention are accomplished by fabricating a fuel cell comprising a housing, a lightweight anode, an electrolyte matrix comprising a conductive layer bonded to a non-conductive layer, a conductive current collector adjacent the non-conductive layer of said matrix, and a light weight cathode. A liquid electroylte is retained in the electrolyte matrix. The composite cell extending from the outside anode surface to outside cathode surface will comprise less than 0.025", permitting the stacking of many cells in a small area.

Referring to the drawing, 1 defines the housing of the cell with parts 1a and 1b functioning to hold the components of the cell in operable relationship. Elements 2 and 6 are the lightweight electrodes, i.e., the anode and cathode of the cell, spaced apart by electrolyte matrix 3 made up of conductive element 3a and non-conductive element 3b. The non-conductive element is in intimate contact with conductive layer 5. A fuel is fed to compartment 8 through inlet 8a and vented through outlet 8b. Oxidant is fed to compartment 7 through inlet 7a and vented through outlet 7b. As is apparent, by modification of the apparatus, any number of cells can be electrically connected in series or parallel arrangement.

The electrodes employed in the present invention are light weight, extremely thin structures, preferably obtained by applying a uniform admixture of an electrochemically active metal and a hydrophobic polymer directly onto the external surfaces of the electrolyte matrix, i.e., conductive element 3a, and non-conductive element 3b, or conductive layer 5, where employed. The electrochemically active metal containing material includes copper, gold, nickel, silver, cobalt, alloys thereof, and the like. However, because of their exceptional properties for enhancing an electrochemical reaction, the Group VIII metals of the Mendelyeev's Periodic Table and alloys thereof are preferred, i.e., platinum, ruthenium, palladium, osmium, iridium, and rhodium. The polymer which is dispersed with the catalytic metal must be relatively hydrophobic and additionally, be resistant to heat and the corrosive environment of the fuel cell. Suitable materials include polytetrafluoroethylene, polystyrene, polyethylene, polytrifluorochloroethylene, polyvinylfluoride, polyvinylidenefluoride, and co-polymers thereof. The electrodes are preferably applied to the matrix by pressing, rolling or spraying a uniform dispersion of the electrochemcially active material and hydrophobic polymers onto the external surfaces of the electrolyte matrix. In order to obtain bonding and structural integrity, the structure is thereafter heated at a temperature sufficient to sinter at least the polymer particles.

Non-porous palladium silver alloy membrane electrodes can be employed as the anode, with advantage, where hydrogen is selected to be the fuel. These electrodes, which are described in Oswin, U.S. Patent No. 3,092,517, are highly desirable in that there is no difficulty encountered as a result of blocking of the electrode with gaseous impurities or flooding of the electrodes with electrolyte. Moreover, the electrodes are extremely light in weight and can be fabricated as exceedingly thin films.

The conductive element of the electrolyte matrix is a metal which is resistant to the electrolyte and must be highly conductive when applied as a relatively thin film. Suitable metals are nickel, copper, tantalum, and the more noble metals such as gold, silver, palladium, platinum, and rhodium. However, in order to hold down the cost of the cell, the relatively inexpensive metals such as nickel and tantalum are preferred. This conductive element serves at least three functions, i.e., it is a matrix, a current collector and the strength carrying element.

The non-conductive element of the electrolyte matrix must be resistant to the electrolyte under the operating conditions of the cell. Examplary materials include cerium oxide, thorium oxide, silica, zirconium oxide, and magnesium oxide. The conductive and non-conductive layers can be held in intimate contact by physically bonding, or the non-conductive element can be sprayed onto the conductive element by flame spraying, electrophoresis or the like. It is necessary, however, that the elements be held in close adherence to keep the ohmic resistance of the cell as low as possible. In view of the above, it is preferred that the non-conductive element be applied directly to the conductive layer by flame spraying, electrophoresis or by actual sintering together of the two elements.

Although the electrodes are conductive in and of themselves, enhanced cell performance is obtained by coating the outside surface of the non-conductive element of the electrolyte matrix with a thin film of conductive metal such as gold or the like or by pressing a metal support into contact with the catalytic layer such as a screen, expanded metal, mesh or felt. The metal film or support can be composed of any element which is electronically conductive including nickel, tantalum, copper, gold, silver, palladium, platinum, rhodium, and the like. However, because of the relative inexpensiveness, again nickel and tantalum supports are preferred when used as a screen, or gold, silver, and nickel when used as a deposited thin film.

Various liquid electrolytes can be employed to impregnate the matrix of the cell. Thus, aqueous solutions of the alkali metal hydroxides such as potassium, sodium, rubidium, and cesium hydroxide, or the alkaline earth carbonates can be employed. Furthermore, depending upon the matrix, acid electrolytes such as sulfuric acid and phosphoric acid can be selected. The electrolyte concentration can be maintained in the cell by a wicking action of the matrix. For example, the non-conductive and conductive layers of the matrix can be suspended in a solution of free electrolyte.

The fuel cell of the present invention can be operated with fuels commonly employed in the art such as hydrogen, the carbonaceous fuels, and ammonia. Depending upon the fuel selected, the anode material will possibly vary. Thus, if hydrogen is to be the fuel, it is possible to use the non-porous palladium silver alloy membranes described hereinbefore. On the other hand, if a carbonaceous fuel is selected, the membrane must be porous. Additionally, the electrochemical reactive metal will be different if the electrode is to be used as the cathode of the cell and operated on air as the oxidant. It has been found, for example, that silver and gold, or alloys thereof, are excellent activating materials for the cathode. Furthermore, the fuel cell of the invention can be operated in a wide temperature range. However, one of the outstanding features of the present compact cell is its ability to provide a practical current output at given voltages at low temperatures. Preferably, therefore, the present cell will be operated at temperatures of from about 25 to 200° C. However, the cell can be operated at temperatures as high as about 300° C., it being understood that generally the higher the temperature, the greater the rate of the electrochemical reaction. It is further understood, however, that at higher temperatures, ancillary problems such as insulation of the cell and the like are increased.

The thicknesses of the various components of the cell are not critical. However, it is apparent from what has been said hereinbefore that a minimum thickness is desired. This expediency permits a high energy to volume and high energy to weight ratio and substantially reduces the ohmic resistance across the various components of the cell. Thus, it has been found that the total compact cell of the present invention will be no more than about 0.025″. The electrodes of the cell will normally be of a thickness ranging from 0.1 to 5 mils with the electrolyte matrix being from 10 to 20 mils and the conductive layer adjacent the non-conductive component of the electrolyte matrix being from 0.1 to 1 mils thick. As is apparent, however, the aforesaid dimensions can fluctuate substantially.

Having described the invention in general terms, the following example is set forth to more particularly illustrate the invention. Parts are by weight unless otherwise specified.

Example

A fuel cell was constructed substantially as shown in the drawing. Housing 1 is composed of nickel. Matrix 3 comprises a 0.010″ porous nickel sheet which has been flame sprayed with a 0.01″ thick coating of cerium oxide. A conductive layer 5, composed of gold and approximately 0.0005″ thick, was electrodeposited onto the cerium oxide matrix. Electrodes 2 and 6 are sprayed onto the nickel and gold faces of the matrix from a uniform dispersion in water of platinum black and polytetrafluoroethylene (PTFE) to provide 8 mg./cm.$^2$ of platinum and 3.4 mg./cm.$^2$ of PTFE. The total thickness of the cell, neglecting the housing, is 0.025″. Matrix 3 is impregnated with a 28 percent solution of aqueous potassium hydroxide by pressure techniques. The cell, when fed with hydrogen at one p.s.i.g. and oxygen at one p.s.i.g. at 60° C., provided a current density of 90 ma./cm.$^2$ at 0.89 volt.

In the above example, various modifications can be made in the cell structure. Thus, the anode can be replaced by thin screen-type electrodes or the nickel impregnated electrodes; and, in the event hydrogen is used as fuel, by palladium-silver alloy non-porous membranes. Additionally, the cathode can be replaced by screen-type electrodes activated with silver and gold or an alloy of silver and gold. Furthermore, the gold conductive layer adjacent the cerium oxide layer can be eliminated and a metal support pressed into the catalytic layer in contact with the cerium oxide to provide the improved conductivity. Furthermore, matrix 3 can be composed of any one of numerous materials as described hereinbefore. As will be apparent to one skilled in the art, numerous modifications can be made without departing from the inventive concept herein described and such embodiments are within the ability of one skilled in the art. The invention is only to be limited by the appended claims.

It is claimed:

1. A compact fuel cell for the direct production of electrical current from a fuel and oxidant comprising a multiple constituent electrolyte matrix for retaining a liquid electrolyte composed of a nickel layer in intimate contact with one side of a non-conductive layer, a layer of gold in contact with the second side of said non-conductive layer, a layer of catalytic material composed of a uniform admixture of platinum black and polytetrafluoroethylene on each of said nickel and gold surfaces, said electrolyte matrix being flooded with an aqueous ionic conductive fluid.

2. The compact fuel cell of claim 1, wherein the non-conductive layer is thorium oxide.

3. The compact fuel cell of claim 1 wherein the non-conductive layer is cerium oxide.

4. A compact fuel cell for the direct production of electrical current from a fuel and oxidant comprising a multiple constituent electrolyte matrix for retaining an electrolyte comprising a conductive element composed of a metal selected from the group consisting of Groups I–B and VIII of the Mendelyeev's Periodic Table and tantalum in intimate contact with one side of an inorganic non-conductive element, a conductive layer in contact with the second side of said non-conductive element, said conductive layer being composed of a metal selected from the group consisting of Groups I–B and VIII of the Mendelyeev's Periodic Table, a layer of catalytic material comprising a uniform admixture of an electrochemically active metal selected from the group consisting of Groups I–B and VIII of the Mendelyeev's Periodic Table, alloys and mixtures thereof, and a hydrophobic resin on each of said conductive element and conductive layer, said electrolyte matrix including an ion-conductive fluid.

5. The compact fuel cell of claim 4 wherein the conductive element is nickel.

6. The compact fuel cell of claim 4 wherein the conductive element is tantalum.

7. The compact fuel cell of claim 4 wherein the conductive element is silver.

8. The compact fuel cell of claim 4 wherein the nonconductive element is thorium oxide.

9. The compact fuel cell of claim 4 wherein the nonconductive element is cerium oxide.

10. The compact fuel cell of claim 4 wherein the nonconductive element is zirconium oxide.

11. The compact fuel cell of claim 4 wherein the hydrophobic resin is polytetrafluoroethylene.

12. The compact fuel cell of claim 11 wherein the electrochemically active metal is silver.

13. The compact fuel cell of claim 4 wherein at least one of said conductive element or conductive layer is a metal film or sheet.

14. The compact fuel cell of claim 11 wherein the conductive element is composed of nickel and the conductive layer is composed of gold.

References Cited
UNITED STATES PATENTS

| | | | |
|---|---|---|---|
| 3,146,131 | 8/1964 | Linden et al. | 136—86 |
| 3,235,473 | 2/1966 | Le Duc | 136—86 X |
| 3,297,484 | 1/1967 | Niedrach | 136—86 |
| 3,382,105 | 5/1968 | McBryar et al. | 136—86 |

OTHER REFERENCES

Baur et al.: Uber Brennstoff-Ketten Mit Festleitern, in Ztschr. Elektrochem, Bd. 43, No. 9, 1937, pp. 728, 729, 731.

ALLEN B. CURTIS, Primary Examiner